United States Patent [19]

Sakamoto

[11] Patent Number: 4,573,071

[45] Date of Patent: Feb. 25, 1986

[54] METHOD AND SYSTEM FOR DISPLAYING A COLOR IMAGE SIMULATING A MULTI-COLOR PRINTED MATTER ON A SCREEN

[75] Inventor: Takashi Sakamoto, Kyoto, Japan

[73] Assignee: Dainippon Screen Mfg. Co., Ltd., Kyoto, Japan

[21] Appl. No.: 497,492

[22] Filed: May 24, 1983

[30] Foreign Application Priority Data

Jun. 8, 1982 [JP]  Japan ................................. 57-98980

[51] Int. Cl.$^4$ .............................................. H04N 1/40
[52] U.S. Cl. .......................................... 358/76; 358/80
[58] Field of Search ................................... 358/76, 80

[56] References Cited

U.S. PATENT DOCUMENTS

| 4,364,084 | 12/1982 | Akimoto | 358/76 |
| 4,393,398 | 7/1983 | Horiguchi | 358/76 |
| 4,511,989 | 4/1985 | Sakamoto | 364/723 |

FOREIGN PATENT DOCUMENTS

| 54-38921 | 11/1979 | Japan . |
| 54-38922 | 11/1979 | Japan . |
| 54-40961 | 12/1979 | Japan . |
| 56-26015 | 6/1981 | Japan . |
| 1367564 | 9/1974 | United Kingdom . |
| 2106350A | 10/1982 | United Kingdom . |

*Primary Examiner*—Michael A. Masinick
*Attorney, Agent, or Firm*—Lowe, King, Price & Becker

[57] ABSTRACT

Values of color component densities for Red(R), Green(G) and Blue(B), the primary colors of a light image, are used to provide data for each of a number of printing inks, such as Cyan(C), Magenta(M), Yellow(Y) and Black($B_K$), used for producing multi-color prints. The data, obtained by applying the so-called "density-saturation theory", are retrieved from a memory device and added selectively for all the ink colors to obtain total density signals representative of the color components. After processing, these signals control a color cathode ray tube (CRT) to display a color image simulating the multi-color prints.

10 Claims, 7 Drawing Figures

METHOD AND SYSTEM FOR DISPLAYING A COLOR IMAGE SIMULATING A MULTI-COLOR PRINTED MATTER ON A SCREEN

FIELD OF THE INVENTION

The present invention relates to a color proof means, such as an electronic color simulation system, which determines the correctness of color separation work in a color plate producing process prior to final printing by simulating a color image on a color cathode ray tube (CRT) screen identical to the final prints.

BACKGROUND OF THE INVENTION

On producing color prints, a variety of colors and tones is normally obtained by successively applying inks of Cyan(C), Magenta(M) and Yellow(Y) (primary colors in subtractive mixture) as well as Black-($B_K$) ink, which mainly compensates dark part density graduation at desired proportions. The amount of each ink to be applied is directly controlled by a corresponding color separation plate which, therefore, defines the final color tone of the printed matter. Prior to final printing, test prints or proofs are made to check the final color tone expected to result from use of the color separation plates, the plates being modified or reproduced if necessary. This procedure is known as color proofing.

A conventional color proofing process consists of making printing plates from each of a plurality of color separation films Y, M, C, $B_K$, test printing with the printing plates and corresponding printing inks to obtain a proof and, if deemed necessary either from the proof or from the conditions of the original color film and/or each color separation film Y, M, C, $B_K$, modifying the separated color films (hand retouching) or, after adjusting tone and/or color separation conditions, reproducing new color plates and producing a new proof. This means that after the color plates are modified or reproduced, each printing plate corresponding to the separated color films must be made and a test printing with the printing plates must be done with a proof-printing press. Therefore, the conventional proofing method is a trial and error process and involves expenditures of much time and cost.

To overcome these difficulties, several electronic color proofing systems have been realized. One such system records each video signal obtained from each separated color film Y, M, C, $B_K$ through a TV camera, retrieves the recorded video signals synchronously, performs necessary calculations with the signals in an electronic circuit for generating color tones identical to those of a print to be produced, and displays the result of the calculations on a color monitoring screen. Another system employs flying-spot scanners which scan a set of separated color films synchronously to display a color image without recording any video signal. Another new system, known as a layout scanner system, records on a memory device such as a magnetic disc each color density signal obtained from color components by a color scanner. The system transfers each color density signal to a refresh memory to display color tone simulating that of a print to be produced.

However, it should be noted that there exists a recognizable gap between the spectral characteristics of ideal inks and those of actual printing inks which contain unwanted color absorbing factors which are usually expressed as ink impurities. Therefore, when displaying a color image on a color monitoring screen by using video signals obtained from each film of separated color through a TV camera, a circuit is required to calculate how much each monochromatic color printed with a relevant color plate will be affected by the impurity of the corresponding ink. Additionally, a circuit is also required to calculate how discolored a final multi-color print will be, printed with all the color plates and corresponding inks.

In this connection, several methods of performing these color calculations are already disclosed.

One of the methods is described as follows. That is, at first, preliminarily digitizing density signals of separated colors corresponding to printing inks, normally Cyan(C), Magenta(M), Yellow(Y) and Black ($B_K$), on a necessary density graduation for expressing desired color tone, secondly preparing a look-up-table memory loaded with values which, verified by actual test printing and subsequent comparison, correspond to all the possible combinations of every density graduation level of each color separation film. Thereafter, Red(R), Green(G) and Blue(B) signals which will embody color tone identical to that of a print to be produced can be directly retrieved from the look-up-table memory, by using address signals utilizing the separated color density signals.

In the above method, if an equation is available which is based on fundamental characteristic values and is capable of predicting the color tone to be produced by actual printing, the equation may be applied instead of said digitized signals.

On the other hand, when digitizing each color density signal, maintaining of natural color tone normally requires a density graduation of about 256 levels for each of the C, M, Y and $B_K$ color plates. This means that the number of combinations of every density level of each color plate is $(256)^4 \approx 4 \times 10^9$, which requires too large a memory capacity. For this reason, as disclosed in Japanese Patent Application No. 56-93013, U.S. Ser. No. 378,792, by the same applicant, preparation of a conveniently thinned out look-up-table memory along with the interpolation (in the above case, fourth-degree-calculations) is proposed.

With this improved method, the actual equation to be used for interpolation is rather simplified. However, an application of the equation to hardware still involves some problems such as complexity of multiplying circuits and requirements of comparison circuits for adapting to various situations. All of these problems will be multiplied, especially when more than four printing inks are used, resulting in complex and expensive hardware.

Another method of performing the aforesaid calculations replaces the look-up-table memory with real time calculation which predicts the color tone to be printed from each color density signal.

To embody the real time calculation, several methods have been previously suggested. One of them utilizes Neugebauer's equation or its derivative equation, as disclosed in Japanese Patent laid open No. 49-12910, U.S. Ser. No. 235,296). This method includes the steps of determining quantities of inks to be used from each of the separated color signals Y, M, C, $B_K$, calculating area rates for every possible combination of inks, multiplying the area rates by each specific reflex factor and summing these values to predict the mean color tone to be printed with a plurality of inks.

With this method, the more printing inks are used, the more terms are needed in the calculations to obtain the area rates. This inevitably involves complicated settings of factor data for the terms in the equations and consequently requires a complex and expensive system.

Though the Neugebauer's equation is comparatively clear, it is also well known that, when the equation is applied for prediction of color tone to be printed with a typical halftone dot density of about 150 lines per inch, the equation gives little success.

Modification and correction of the Neugebauer's equation in an attempt to obtain successful application would lead to introduction of exponential terms in equations, as seen in said Japanese Patent laid open No. 49-12910, resulting in still more complicated calculations.

There are other methods for real time calculation, as disclosed in Japanese Patent Publication Nos. 54-38921, 54-38922 and 56-26015. The method of said Japanese Patent Publication Nos. 54-38921 or 54-38922 include the steps of determining the quantities of inks to be used from each density signal of separated colors and summing the values of density signal of R, G, B of each printing ink selectively to obtain the total value of each separated color component density wherein it is assumed that the values of density signal of R, G, B of an ink increases proportionally with the amount of the ink. However, in the printing process there is a characteristic known as additivity-law failure, owing to a characteristic whereby a portion of a print with multiple inks is seen too thick of its color factor on a CRT monitor provided that a higher performance of realization of color scanning for a portion of a printed matter with one ink is achieved. Therefore, practically, an approach of under-color-removal as used in color scanners is introduced into the above method to rectify the signals of color components R, G, B of the portion printed with multiple colors.

The method of the said Japanese Patent Publication No. 56-26015 includes the steps of selectively summing the values of density signals of R, G, B, calculated from the amount of each ink to be used to obtain the total value of each color component density, calculating correcting terms against additivity-law failure by multiplication and adding the obtained values to the total value of each composed color density to predict the color tone of a print to be produced.

All these aforesaid methods for real time calculation, however, require circuits for detecting portions with multiple separated colors on a print and circuits for multiplications of each density value of color components. In addition, an exact prediction of the color tone to be printed requires an appropriate selection of factors for every term used in the equations and, when more than four printing inks are used, the increased number of combinations of separated colors would render these methods impracticable.

In particular, with the method using correcting terms against additivity-law failure, those correcting terms in equations which have been found relatively small through taking the amount of impurity of ink into account are neglected while this omission could be better avoided for correctness.

It is, accordingly, an object of the present invention to overcome the disadvantages in the prior methods by providing a method and system that will utilize simpler calculations leading to simpler calculating circuits and realize the display of a better color image of a color printed matter on a screen.

The calculations used in the present invention rely upon the so-called density-saturation theory. By applying the theory, each R, G, and B color signal to be input to a color picture tube can be obtained through selective summing of Value $L = -\log(1 - D_i/k)$ for each value of color component density as shown in equations (3), (4) and (5) below, wherein k is a constant of density-saturation point; Di is each value of color component density signal contained in a color density signal corresponding to the amount of a printing ink, such as C, M, Y or $B_K$; and L is a common term used in the equations (3), (4) and (5) which are derived from the density-saturation theory.

More specifically, the system of the present invention will have a memory loaded with the Value $L = -\log(1 - D_i/k)$ corresponding to one of the color components corresponding to a printing ink to be used and the values will be retrieved from the memory to be summed for each total density of color components, which will finally control a color picture tube.

BRIEF DESCRIPTION OF THE DRAWINGS

An embodiment of the present invention will now be described by way of example and will reference to the accompanying drawings, in which.

DESCRIPTION OF THE PREFERRED EMBODIMENT

As previously noted, the present invention is based on the density-saturation theory. According to the theory, there exists a phenomenon that, owing to first surface reflection, internal multiple reflections, ink opacity, trapping, reverse transition effect, color separation characteristic, half tone structure, scattering of light inside of paper and the like, the sum of each color component density always exceeds the actual color density of a printed matter or, in other words, applying more inks cannot increase a value of color density (D) of a printed matter proportionally. Instead, the density, which only converges to the density-saturation point (k), can be expressed by the following equation (1):

$$D = k\left[1 - \left(1 - \frac{D1}{k}\right)\left(1 - \frac{D2}{k}\right)\cdots\left(1 - \frac{Dn}{k}\right)\right] \quad (1)$$

wherein $D_1, D_2, \ldots D_n$ are graduated values of color separation density of each density signal of color components.

For example, in a case where four color inks of C, M, Y and $B_K$ are used and total density value D of R color is being calculated, $D_1, D_2, D_3$ and $D_4$ will correspond to the density value of the R element of each of the separated colors, that is $Y_r, M_r, C_r, K_r$. In a case where more or less than four printing inks are used, an expected value of total color density (D) can be obtained by determining the specific density ($D_i$) of each of the color components of R, G and B of every printing ink.

The good applicability of the density-saturation theory is reconfirmed by the applicant of the present invention.

Equation (1) is, however, still too complex and difficult to be applied to real time color calculation necessary for meeting the displaying speed of a color monitoring device.

To overcome this problem, the present invention transforms equation (1) into equation (2) below and performs a calculation by using equation (2).

$$1 - \frac{D}{k} = \left(1 - \frac{D1}{k}\right)\left(1 - \frac{D2}{k}\right) \cdots \left(1 - \frac{Dn}{k}\right) \quad (2)$$

$$\log\left(1 - \frac{D}{k}\right) =$$

$$\log\left\{\left(1 - \frac{D1}{k}\right)\left(1 - \frac{D2}{k}\right) \cdots \left(1 - \frac{Dn}{k}\right)\right\}$$

$$\log\left(1 - \frac{D}{k}\right) = \log\left(1 - \frac{D1}{k}\right) +$$

$$\log\left(1 - \frac{D2}{k}\right) + \ldots + \log\left(1 - \frac{Dn}{k}\right)$$

The present invention, therefore, uses $\log(1 - Di/k)$ as a basic unit itself or as data representative of the amount of ink in a calculation.

Figure 1:
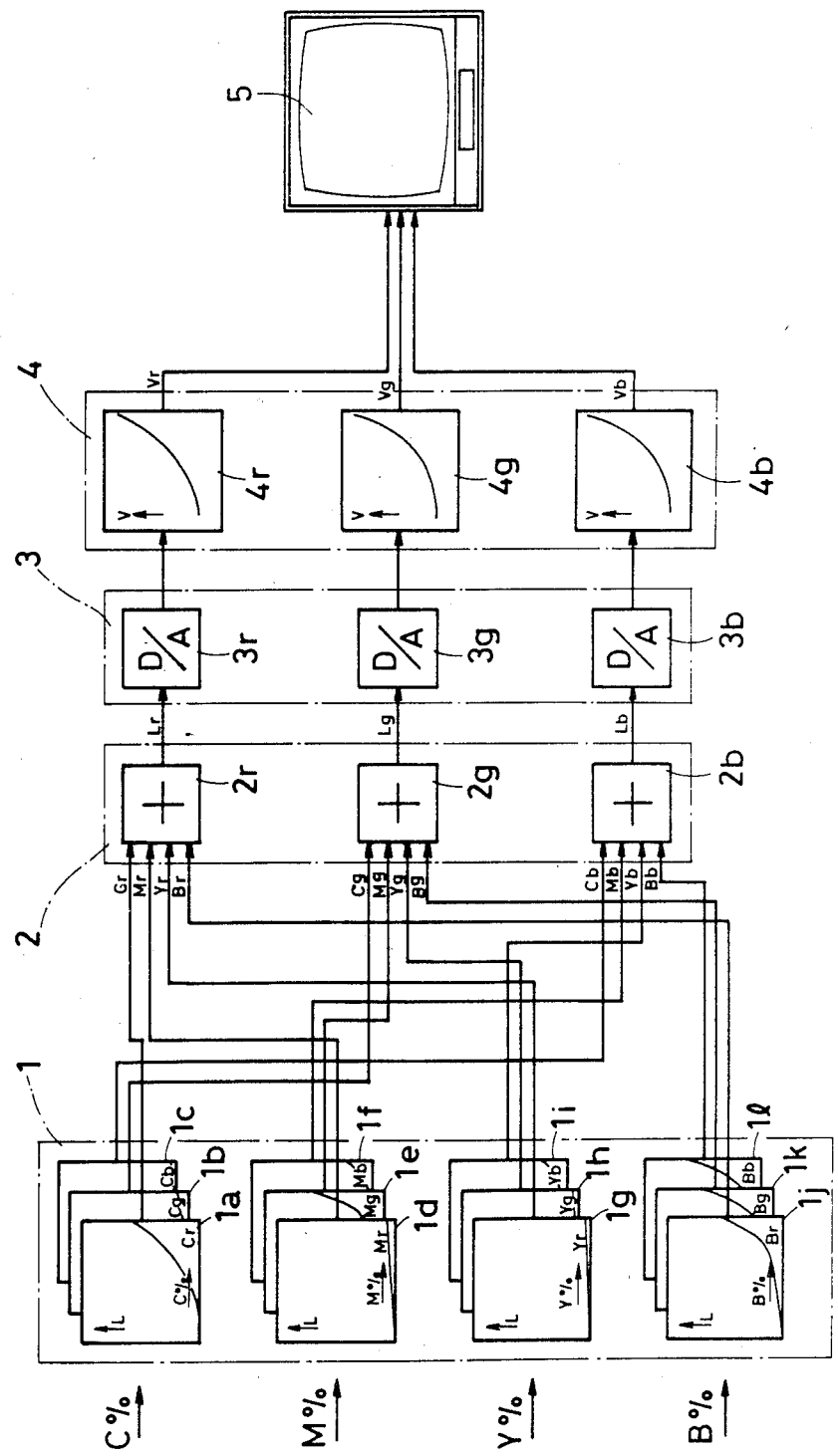
FIG. 1 is an illustration explaining the general concept of the present invention.

FIG. 1 shows a typical configuration for embodying the present invention. In FIG. 1, 1 ($1_a$, $1_b$, ... $1_l$ is a look-up-table memory which, for each quantity of ink, is loaded with values of $L = \log(1 - Di/k)$, calculated from the density value $D_i$ of color components instead of the value $D_i$ itself (also seen in FIGS. 3 to 6).

This look-up-table memory for the separated colors is loaded with the value L calculated by using the values of each separated color density corresponding to the amount of each ink determined by measuring the values of separated color density of each proof.

When the ink amount has a density graduation of 256 levels, the same number of memory addresses to store said value L for each of color components R, G, B, are required. For example, when four inks are used and a graduation of 256 levels is also required for the Value L, a memory device having a capacity of about 3K bytes ($4 \times 3 \times 256 = 3072$) is necessary.

Figure 2:
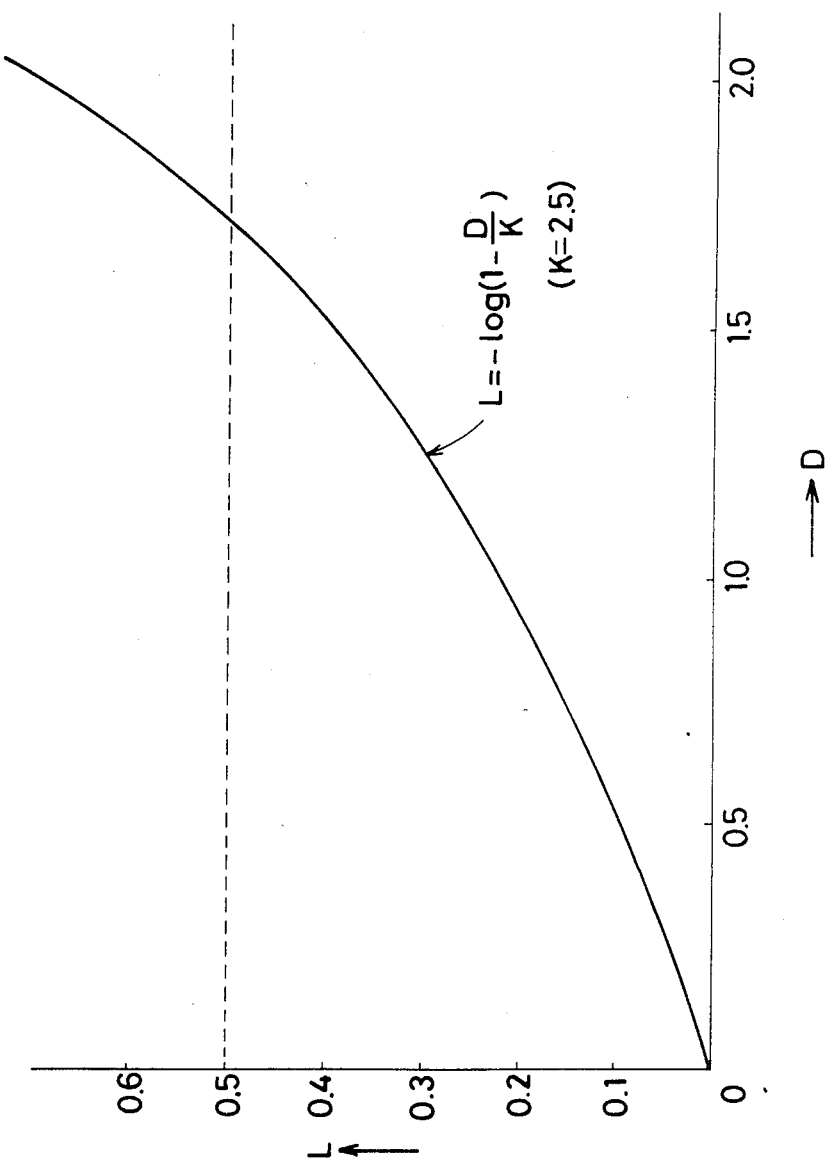
FIG. 2 is a graph showing a typical characteristic curve of $-\log(1 - D_i/k)$ as a function of $D_i$.
Figure 3:
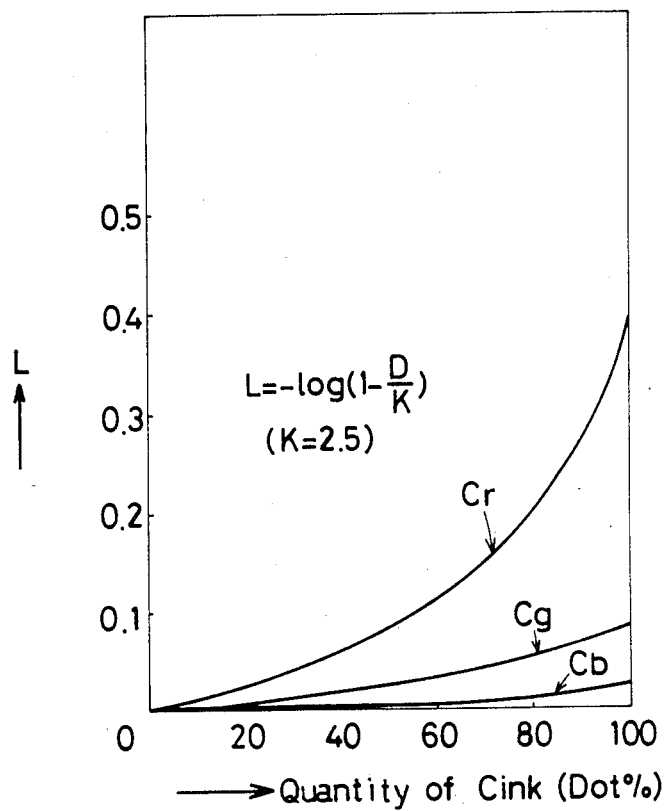
FIGS. 3 to 6 are graphs showing the typical characteristic curves stored in a memory device.
Figure 4:
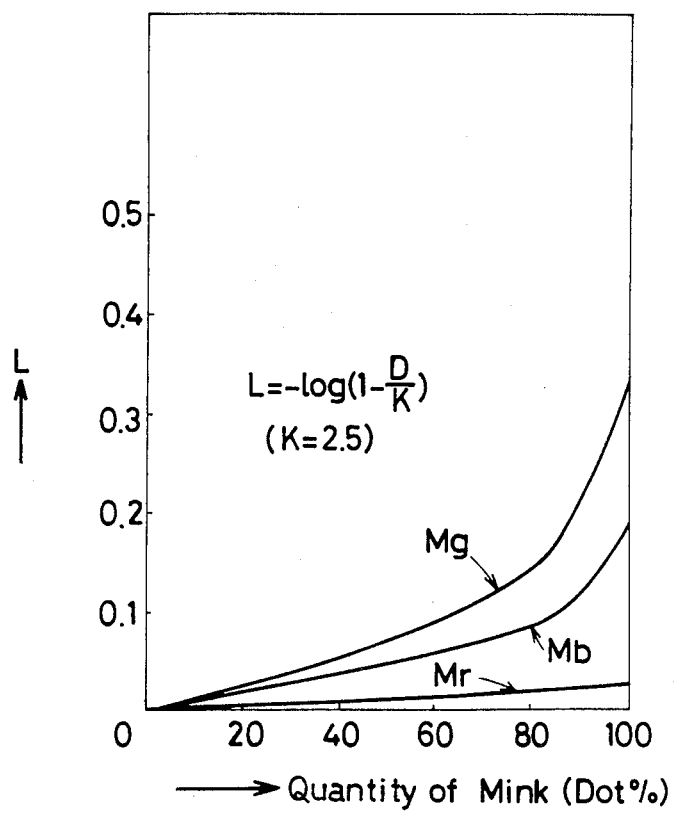
Figure 5:
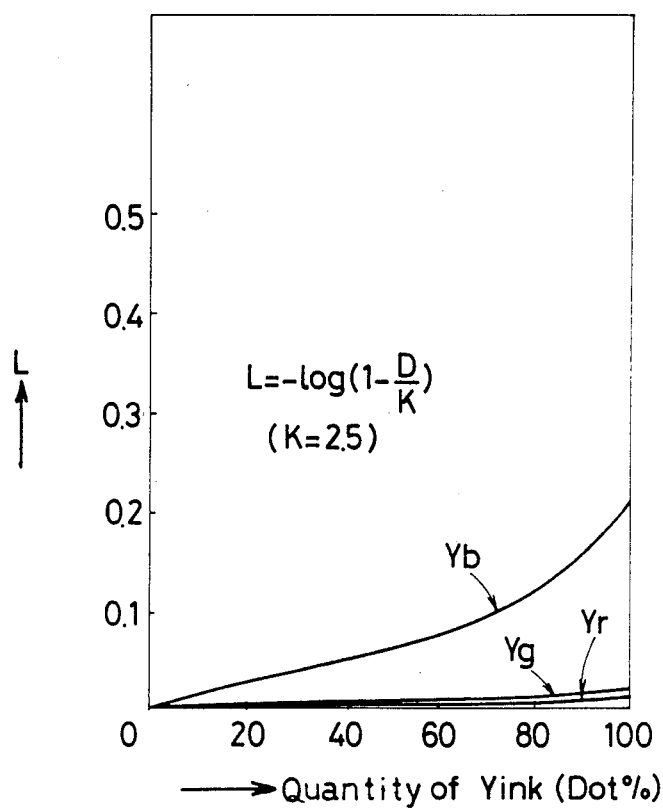
Figure 6:
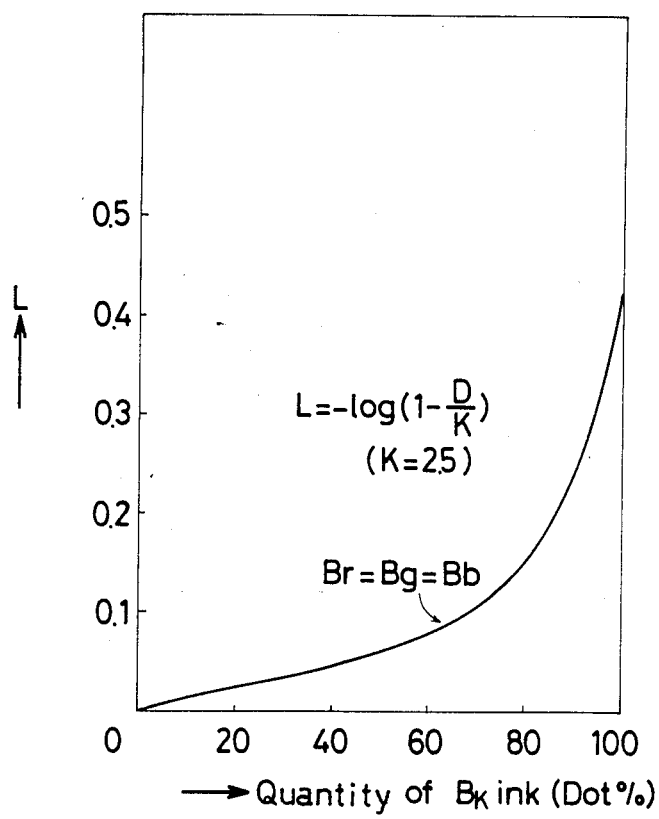

FIG. 2 shows a curve of $L = -\log(1 - Di/k)$, wherein k is 2.5.

FIGS. 3, 4, 5 and 6 show typical characteristic curves L for each of R, G and B color components contained in inks of C, M, Y and $B_K$ respectively. In these figures, $C_r$, $C_g$ and $C_b$ are density values of color components R, G, B of C ink respectively; $M_r$, $M_g$ and $M_b$ are density values of color components R, G, B of M ink respectively; $Y_r$, $Y_g$ and $Y_b$ are density values of color components R, G, B of Y ink respectively; and $B_r$, $B_g$ and $B_b$ are density values of color components R, G, B of $B_K$ ink respectively.

With a memory device having such a capacity as to store these data, $\log(1 - Cr/k)$, $\log(1 - Cg/k)$ and $\log(1 - Cb/k)$ can be retrieved for the ink quantities of the C color plate; $\log(1 - Mr/k)$, $\log(1 - Mg/k)$ and $\log(1 - Mb/k)$ can be retrieved for the ink quantity of the M color plate; $\log(1 - Yr/k)$, $\log(1 - Yg/k)$ and $\log(1 - Yb/k)$ can be retrieved for the ink quantity of the Y color plate; and $\log(1 - Br/k)$, $\log(1 - Bg/k)$ and $\log(1 - Bb/k)$ are retrieved for the ink quantity of the $B_K$ color plate without a complicated calculation of interpolation.

These values are selectively summed as to each of three primary colors of R, G and B in respective adder devices 2 ($2_r$, $2_g$ and $2_b$) as follows:

$$\log\left(1 - \frac{Cr}{k}\right) + \log\left(1 - \frac{Mr}{k}\right) + \quad (3)$$

$$\log\left(1 - \frac{Yr}{k}\right) + \log\left(1 - \frac{Br}{k}\right) = Lr$$

$$\log\left(1 - \frac{Cg}{k}\right) + \log\left(1 - \frac{Mg}{k}\right) + \quad (4)$$

$$\log\left(1 - \frac{Yg}{k}\right) + \log\left(1 - \frac{Bg}{k}\right) = Lg$$

$$\log\left(1 - \frac{Cb}{k}\right) + \log\left(1 - \frac{Mb}{k}\right) + \quad (5)$$

$$\log\left(1 - \frac{Yb}{k}\right) + \log\left(1 - \frac{Bb}{k}\right) = Lb$$

Note: $\log(1 - Di/k)$, instead of $-\log(1 - Di/k)$, is used for convenience. $L_r$, $L_g$ and $L_b$ signals are converted into analogue signals by respective D/A converters 3 ($3_r$, $3_g$ and $3_b$) and then converted into input signals for a color CRT by respective characteristic transforming circuits 4 ($4_r$, $4_g$ and $4_b$).

Figure 7:
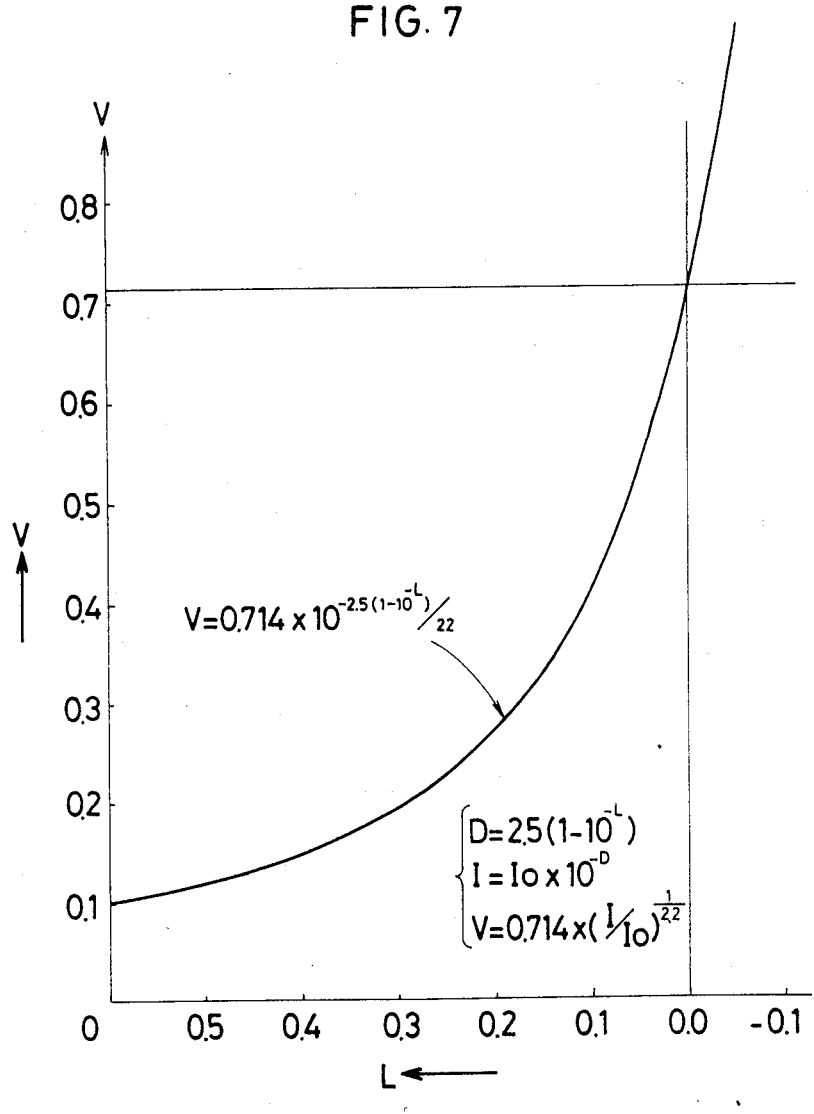
FIG. 7 is a graph showing a typical characteristic curve of a characteristics transforming circuit.

The circuit 4 for transforming characteristic has three functions (see FIG. 7). The first is to convert the $L = \log(1 - D/k)$ signal into a density signal D as follows:

$$D = k \cdot (1 - 10^{-L}) \quad (6)$$

Note: In equations (3), (4) and (5), L has a negative value.

The second is to convert the density signal into a brightness signal as follows:

$$I = I_o \cdot 10^{-D} \quad (7)$$

wherein $I_o$ is a brightness equivalent to $D = 0$.

The third is to convert the brightness signal into an input voltage for a color CRT as follows:

$$V = V_o \cdot (I/I_o)^{1/2.2} \quad (8)$$

This invention may be practiced or embodied in still other ways without departing from the spirit or essential character thereof. For instance, while in FIG. 1 the three converting functions are achieved in a single stage, these functions may alternately be achieved separately in two or three stages.

Also, while in FIG. 1 the circuit 4 for transforming characteristic ($4_r$, $4_g$ and $4_b$) is arranged behind the D/A converter 3 ($3_r$, $3_g$ and $3_b$), all or part of the converting functions of the circuit 4 for transforming characteristic may alternately be achieved by digital processing using a set of digital table memories before being converted from digital to analogue.

Additionally, the total system including color component table memories may alternately be embodied as an analogue circuit to output signals to the color CRT 5.

As described hereinbefore, the present invention uses the equation of the density-saturation theory, though it is transformed, without any approximation or omission. Therefore, the present invention provides the highest reliability in correction of the additivity-law failure.

Moreover as values of log $(1-D/k)$ calculated from density values of color components and density-saturation point are stored in memory tables beforehand, if color calculation is performed in digital circuits, the only calculation necessary is addition in the adder 2 ($2_r$, $2_g$ and $2_b$), and real time conversion is possible.

Still another feature is that, when more than four inks, such as five or six inks are used, the look-up-table memory ($a_a$, $1_b$, ... $1_l$) will be kept intact, new look-up-table memory of R, G and B for each added ink will be equipped, and each color component signal retrieved from the new memories will be selectively introduced to the adder 2 without the difficulties as would be encountered with the prior methods.

I claim:

1. A method for displaying a color image, simulating a multi-color print on a color picture displaying device by using density signals of separated colors obtained from an original color picture, comprising the steps of:
   (a) retrieving from a memory device a value—log $(1-Di/k)$ (where k is a constant of density-saturation point) corresponding to a density $D_i$ of each of the separated color components relative to said density signals;
   (b) selectively summing said values of step (a) to obtain a total density signal for each color component; and
   (c) controlling said color picture displaying device by using said total density signal for each decomposed color.

2. A method according to claim 1 comprising the further step of converting digital signals representing the summed values obtained in step (b) into analogue signals to be utilized for an analogue circuit which produces control signals for a display device.

3. A method according to claim 1 in which control signals for a display device, stored in a further memory, are retrieved from the memory to the display device by using digital signals corresponding to the summed values obtained in said step (b), the retrieved signals being input to the display device after undergoing a digital-analogue conversion.

4. A method as recited in claim 1 comprising the step of inputting to the memory device color density data representing said density of each seperated color component in each ink to be used in said multi-color print.

5. A method as recited in claim 1 wherein said retrieving step further comprises the step of inputting to said memory device data representative of specified ink quantities in order to retrieve said color component densities in the specified ink.

6. A system for displaying a color image simulating a multi-color print on a color picture display device by using density signals of separated colors obtained from an original color picture, comprising:
   (a) table memory means loaded with symbol values $-\log(1-Di/k)$ corresponding to a density $D_i$ for each separated color component relative to said density signal;
   (b) adding means for selectively summing said symbol values retrieved from said table memory to obtain a total density signal for each color component; and
   (c) a converting means for obtaining control signals to be input to a display device by utilizing said summed values.

7. A system according to claim 6 in which said converting means comprises a digital/analogue converter which converts the digital signals of the summed values into analogue signals, and an analogue calculating circuit which produces the control signals to be input to a display device by using said analogue signals.

8. A system according to claim 6 in which said converting means comprises a further table memory which stores control signals corresponding to the summed values obtained in said adding means and a digital/analogue converter which converts the digital signals retrieved from said further table memory into analogue signals which are input to a display device.

9. A system for displaying on a color picture display device a color image simulating a multi-color print by using color separation density signals obtained from an original picture comprising:
   (a) table memory means for storing symbol values—log $(1-Di/k)$ corresponding to a density $D_i$ of each of the separated color components in each of a plurality of inks used to print said color picture;
   (b) means for applying color separation signals representative of said original picture to said table memory means to provide output signals representative of an image to be printed;
   (c) adding means for summing the output signals from said table memory means to obtain a total signal for each separated color components; and
   (d) converting means for converting said total signal to a control signal for input to said color picture display device.

10. A system as recited in claim 9 wherein said table memory means is operable for outputting said signals representative of said image in accordance with quantities of said inks used to print said color picture.

* * * * *